(12) United States Patent
Pree et al.

(10) Patent No.: US 7,848,359 B2
(45) Date of Patent: Dec. 7, 2010

(54) SYSTEM AND METHOD FOR EXECUTING DISTRIBUTED SOFTWARE

(75) Inventors: Wolfgang Pree, Salzburg (AT); Josef Templ, Leonding (AT)

(73) Assignee: Wolfgang Pree GmbH, Salzburg (AT)

( * ) Notice: Subject to any disclaimer, the term of this patent is extended or adjusted under 35 U.S.C. 154(b) by 488 days.

(21) Appl. No.: 11/820,479

(22) Filed: Jun. 19, 2007

(65) Prior Publication Data

US 2008/0013572 A1     Jan. 17, 2008

(30) Foreign Application Priority Data

Jun. 19, 2006   (EP)   .................. 06012518

(51) Int. Cl.
*H04J 3/00* (2006.01)
(52) U.S. Cl. .................. 370/498; 370/464; 705/1.1; 705/300; 705/301; 718/100; 718/102; 718/103; 718/104; 718/105; 718/106; 718/107
(58) Field of Classification Search .......... 370/276, 370/277, 280, 294, 310, 512, 316, 326, 328, 370/329, 336, 345, 464, 478, 498; 717/100, 717/106, 109, 136, 140, 146, 151, 159, 160; 705/1.01, 300, 301; 718/100, 102–107
See application file for complete search history.

(56) References Cited

U.S. PATENT DOCUMENTS

| 5,825,098  | A  | * | 10/1998 | Darby et al. ........... 307/10.1 |
| 6,611,755  | B1 | * | 8/2003  | Coffee et al. ........... 701/213 |
| 7,327,310  | B2 | * | 2/2008  | Abraham et al. ...... 342/357.02 |
| 7,411,903  | B2 | * | 8/2008  | Jang et al. ............. 370/230 |
| 2006/0291657 | A1 | * | 12/2006 | Benson et al. ........... 380/270 |
| 2009/0083702 | A1 | * | 3/2009  | Eichenberger et al. .... 717/109 |

OTHER PUBLICATIONS

Farces, et al, "Transparent Distribution of Real Time Components Based on Logical Execution Time", Proceedings of the 2005 ACM SIGPLAN/SIGBED Conference on Languages, Compilers, and Tools for Embedded Systems, pp. 31-30, (Jun. 15, 2005).*

J. Templ, "TDL Specification and Report", Technical Report T004 (revises T001), Nov. 2004, Department of Computer Science, University of Salzburg, Austria, pp. 1 to 26; (27 pages).

"MCD-2 [FBX] Version 1.1 FIBEX—Field Bus Exchange Format", Release Version, Association for Standardisation of Automation and Measuring Systems; Dated Jan. 25, 2005, ASAM e.V., pp. 1 to 82; (82 pages).

(Continued)

*Primary Examiner*—William Trost, IV
*Assistant Examiner*—Charles C Jiang
(74) *Attorney, Agent, or Firm*—Osha • Liang LLP

(57) ABSTRACT

A system for executing distributed software under hard real-time conditions comprises a plurality of nodes and a communication channel. Nodes are allowed to transmit data across the communication channel within time windows relative to repetitive communication time intervals of the communication channel, wherein a number of bytes transmitted within the communication time windows may vary from communication time window to communication time window. The data may be transmitted as a message comprising a representation of an identifying tag and a representation of the data. Also a number of bytes representing respective tags may vary from communication time interval to communication time interval.

5 Claims, 6 Drawing Sheets

OTHER PUBLICATIONS

E. Farcas, "Approaches to Bus Scheduling for TDL Components", Technical Report 13, Jun. 26, 2006, Department of Computer Science, University of Salzburg, pp. 1-17; XP002426268 (17 pages).

E. Farcas, et al., "Bus Scheduling for TDL Components", Architecting Systems With Trustworthy Components Lecture Notes in Computer Science; LNCS, Springer-Verlag, vol. 3938, Jun. 30, 2006, pp. 71-83; XP019035850 (13 pages).

E. Farcas, et al., "Transparent Distribution of Real-time Components Based on Logical Execution Time", Proceedings of the 2005 ACM SIGPLAN/SIGBED Conference on Languages, Compilers, and Tools for Embedded Systems, Jun. 15, 2005, pp. 31-39, XP002426269 (9 pages).

T.A. Henzinger et al., "Giotto: A Time-Triggered Language for Embedded Programming", Proceedings of the IEEE, IEEE. New York, US, vol. 91, No. 1, Jan. 2003 pp. 84-99, XP011065098 (16 pages).

G. Menkhaus, et al., "Towards Efficient Use of Shared Communication Media in the Timed Model", Proceedings of the 11th IEEE Real Time and Embedded Technology and Applications Symposium, 2005. RTAS 2005. 11th IEEE San Francisco, CA USA Mar. 7-10, 2005, Piscataway, NJ, USA, IEEE, Mar. 7, 2005, pp. 342-351 XP010779559 (10 pages).

International Search Report for International Application No. PCT/EP2007/005307, mailed on Aug. 16, 2007 (2 pages).

European Search Report for European Application No. EP 06 01 2518, dated Mar. 23, 2007 (2 pages).

Declaration Under 37 C.F.R. § 1.132 singed by Wolfgang Pree and Josef Templ, dated Jul. 24, 2007 (2 pages).

Declaration Under 37 C.F.R. § 1.132 signed by Emilia Farcas, dated Jul. 31, 2007 (2 pages).

Written confirmation by Springer Press indicating the correct publishing date for "Bus Scheduling for TDL Components" by E. Fracas et al. with English translation thereof (2 pages).

* cited by examiner

SYSTEM AND METHOD FOR EXECUTING DISTRIBUTED SOFTWARE

BACKGROUND OF THE INVENTION

1. Field of the Invention

The present invention relates to systems and methods for executing distributed software. In particular, the invention relates to such systems and methods which conform with hard real-time requirements.

2. Brief Description of Related Art

Conventional systems for executing distributed software may comprise a plurality of nodes and a communication channel, wherein the system is configured such that the nodes are allowed to transmit data across the communication channel. Examples of such systems also include so called embedded systems in which the nodes which can also be referred to as electronic control units or computers and which perform tasks of the software are encapsulated by devices which they control. Examples of embedded systems include automotive systems, automation systems and avionics systems. An automotive system, for example, may in particular include plural devices for operating brakes, plural devices for sensing wheel speeds, a device for sensing a velocity of the vehicle etc. which communicate across a communication channel and which are configured to perform an operation of an anti-blocking system (ABS). Since the operation of an anti-blocking system is safety critical to the vehicle and its passengers, it is required that repetitive readings of sensors, calculations and updating of actuators is performed periodically, for example, every five milliseconds. In practice, such system has to fulfill hard real-time requirements, which means that a correctness of an operation depends not only upon a logical correctness of the operation but also upon a time at which it is performed. An operation performed later than a deadline defined within the system is, by definition, incorrect, and usually has no value.

The conventional distributed software is typically configured such that the software is separated into a plurality of tasks which the system has to perform, wherein the tasks can be executed by different nodes and wherein also each single node may execute plural tasks. For the operation of the software it is possible that tasks use output signals of sensors as their input, that tasks provide output signals to actuators and that different tasks communicate with each other by exchanging data. Thus, a schedule and execution of tasks may depend on external events which can be detected by the system by means of one or more sensors. Thus, a mode of operation of any system on any node may change over time, and also demands on the communication channel with respect to band width may change over time. However, in the hard real-time system it has to be assured that a given band width provided by the communication channel is sufficient to guarantee fault free operation of the hard real-time system during each possible combination of operational modes of all of the involved nodes.

It is well-known in the art that it is not always easy to design a distributed software such that it fulfills hard real-time requirements.

Various efforts have already been made for improving a design of distributed software. For example, a project called "Giotto" at the University of California at Berkeley, USA resulted in a programming methodology for embedded control systems running on possibly distributed platforms. This methodology includes a concept of defining logical execution timing of execution of tasks under hard real-time conditions. This concept is referred to as "LET" (Logical Execution Time) and illustrated in more detail in the article of T. A. Henzinger et al., "Giotto: A time-triggered language for embedded programming", Proceedings of the First International Workshop on Embedded Software (EMSOFT), Lecture Notes in Computer Science 2211, Springer-Verlag, 2001, pages 166 to 184. The entire contents of this document are incorporated herein by reference.

A language for specifying a timing behavior of distributed software has been developed by Wolfgang Pree and his team in an ad personam research project at the Paris Lodron University of Salzburg, Austria. This language is referred to "TDL" (Timing Definition Language) and defined in the report of Josef Templ, TDL Specification Report, Technical Report T004 (revises T001), November 2004, pages 1 to 26. The entire contents of this document are incorporated herein by reference.

A data exchange format which can be used in distributed software systems for data exchange across a communication channel is defined in the document "FIBEX—Field Bus Exchange Format", MCD-2[FBX] Version 1.1, Release Version, Association for Standardisation of Automation and Measuring Systems, Dated: Jan. 1, 2005, ASAM e.V., pages 1 to 82. The entire contents of this document are incorporated herein by reference.

It has been found that it is difficult to design a distributed software in which a fault free operation is guaranteed for all possible operational modes included in the system.

SUMMARY OF THE INVENTION

The present invention has been made to overcome deficiencies in the prior art as mentioned above.

According to embodiments of the present invention, a system for executing distributed software allows for efficient use of a band width provided by a communication channel of the system.

According to other embodiments of the present invention, a system for executing distributed software allows the system to operate in a multitude of different operational modes while ensuring that timing requirements for data communication across a communication channel are met under all possible combinations of operational modes.

According to an exemplary embodiment of the present invention, a system for executing distributed software comprises a plurality of nodes and a communication channel. For example, the system is an ensemble of nodes which are linked by the communication channel. The communication channel interlinks the nodes of the system physically which means that a particular node is part of the system if it contains at least one controller that is connected to the communication channel. In particular, the system may comprise only one single communication channel having broadcasting semantics which is then commonly referred to as a "bus". However, the present invention is not limited to systems having broadcasting semantics or only one single communication channel but may also comprise systems having plural communication channels of arbitrary topology, such as star, ring, etc. and having different semantics, such as point to point semantics.

The node may be a device which is in some fields commonly referred to as an electronic control unit and which may comprise a circuit configured to control a physical device, such as an actuator, an engine, or a device which provides an interface to a sensor to convert an output signal of the sensor to data which may be processed by the software. The node may also comprise a more complicated circuit which can be also referred to as a computer, which may include a memory, a processor and which may be programmed to perform tasks of the software depending on input data and providing output data.

The distributed software comprises a plurality of tasks. A task represents a portion of a functionality provided by the software. For example, different tasks may be executed by different nodes, and one or more of the nodes may each execute plural tasks. Further, the node may be configured or programmed to provide different modes of operation wherein different tasks are executed in the different modes of operation.

According to an embodiment of the present invention, the distributed software comprises at least a first task and a second task which are not simultaneously executed. Thus, only one of the first and second tasks is executed at a given time.

According to a particular embodiment herein, the first task is executed repetitively at a first frequency such that subsequent invocations of the first task have a time distance from each other which is equal to a first period corresponding to the first frequency. In particular, a duration of the first period may be calculated as one over the first frequency. The task may generate data which is to be transmitted to the communication channel, such that data transmissions of the first data will also occur repetitively at the first frequency which correspond to the first period. The corresponding data transmission by the communication channel occurs within a respective time window having a start time and an end time. Thus, the data transmissions and the corresponding time windows may be also understood as repetitive events occurring on the communication channel.

Similarly, according to this exemplary embodiment of the present invention, the second task generates second data and transmits the second data to the communication channel repetitively at a second period wherein data transmission of the second data occurs within second communication time windows, each having a start time and an end time. Also the data transmission of the second data and the second communication time windows may be understood as repetitive events occurring on the communication channel.

According to this exemplary embodiment, an operation of the communication channel may be understood as conforming with a transmission schedule which is composed of repetitive communication time intervals of a predetermined constant duration, wherein each of the first and second periods is an integer multiple of the predetermined constant duration.

According to a particular exemplary embodiment, the predetermined constant duration is defined as the greatest common divisor of the first period and the second period.

According to the illustrated exemplary embodiment, the first and second tasks which are not concurrently executed, share common time portions of the repetitive communication time intervals of the schedule of the communication channel for transmission of the first data and the second data, respectively. In particular, the start time of the first communication time windows, relative to a respective communication time intervals, is less than the end time of the second communication time windows relative to their respective communication time intervals. Similarly, the start time of the second communication time windows, relative to the respective communication time intervals, is less than the end time of the first communication time windows relative to their respective communication time intervals.

According to embodiments of the present invention, it is possible to save communication band width of a distributed software by sharing available communication time portions of repetitive communication time intervals associated with an operational schedule of the communication channel between different tasks of the software.

According to exemplary embodiments of the present invention, the system comprises one or more controllers, wherein each controller interfaces one or more nodes to the communication channel. Thus, the controller is a dedicated hardware device which is separate from the node and which performs data transmission to and from the communication channel.

According to exemplary embodiments of the present invention, the distributed software may be defined in terms of a plurality of software modules, which are pieces of software having an application programming interface (API). In particular, each module may comprise at least one task. According to a particular embodiment of the present invention, the plurality of modules of the software are definable by the Timing Definition Language TDL as specified in the document "TDL Specification and Report" by Josef Templ mentioned above.

According to an exemplary embodiment, a module may be defined as having two or more different modes, wherein a mode switch changes the mode of the module from one mode to another mode. In particular, a module can be in exactly one mode at any given time. Thus, it is possible to represent operational modes of a system by corresponding modes of modules of the software. Also modes of modules can be specified by the Timing Definition Language TDL.

According to embodiments of the invention, operation of tasks can be specified by Logical Execution Times (LET), wherein the task is configured to have a predefined logical execution time interval associated therewith, wherein a physical execution of an invocation of the task on a node starts at or after a beginning of the logical execution time interval, and wherein the physical execution of the invocation of the task on the node is completed before or at an end of the logical execution time interval.

According to particular embodiments of the present invention, the system for performing distributed software is used for hard real-time applications. In view of fulfilling hard real-time requirements, exemplary embodiments of the present invention provide a system which is configured to maintain, during operation of the system, durations of the first period and the second period constant with a relative accuracy of better than $10^{-3}$, better than $10^{-4}$, or even better than $10^{-5}$ or $10^{-6}$.

Similarly, exemplary embodiments of the present invention provide a system which is configured such that the communication time interval associated with a schedule of the communication channel has a duration of less than 0.01 sec or even less than 0.001 sec.

The data transmitted on the communication channel within respective communication time windows may have various data formats. According to exemplary embodiments of the present invention, the data transmission of the data includes transmission of a message which comprises a representation of the data to be transmitted, and a tag which is indicative of the task which generated the data and which allows a recipient of the message to identify the task which generated the data. Thus, a recipient of the message may distinguish whether the respective message and data contained therein originate from one task or another task.

According to further exemplary embodiments of the present invention, in which the software is defined in terms of modules, the tag may be indicative of the module comprising the task which generated the data. Thus, a recipient of the message may also determine which module was responsible for generating a particular received message.

Still further, exemplary embodiments of the present invention in which the software is defined in terms of modules having different modes, the tag may also be indicative of the mode in which the module was when the data contained in a respective message was generated.

Typically, the data transmission of generated data includes a representation of the data encoded by a certain number of bytes. According to exemplary embodiments of the present invention, a number of bytes used for representing the first data generated by the first task is different from a number of bytes used for representing the second data generated by the second task. Thus, the first and second data may have different data lengths.

Similarly, the data transmission of a tag includes a representation of the tag encoded by a certain number of bytes. According to exemplary embodiments of the present invention, a number of bytes used for representing a first tag forming the first message together with the representation of the first data is different from a number of bytes used for representing a second tag forming a second message together with the representation of the second data. Thus, the first and second tags may have different data lengths.

According to an exemplary embodiment of the present invention, a method of executing distributed software comprises: operating a communication channel allowing communication between nodes of a plurality of nodes; executing at least a first task and a second task on the plurality of nodes such that only one of the first and second tasks is executing at a given time; generating first data by the first task and transmitting the first data to the communication channel repetitively at a first period, wherein the transmitting of the first data occurs within first communication time windows having same start and end times relative to repetitive communication time intervals of a predetermined constant duration; generating second data by the second task and transmitting the second data to the communication channel repetitively at a second period, wherein the transmitting of the second data occurs within second communication time windows having same start and end times relative to the repetitive communication time intervals; wherein each of the first and second periods is an integer multiple of the predetermined constant duration, and wherein the start time of the first communication time windows is less than the end time of the second communication time windows, and the start time of the second communication time windows is less than the end time of the first communication time windows.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
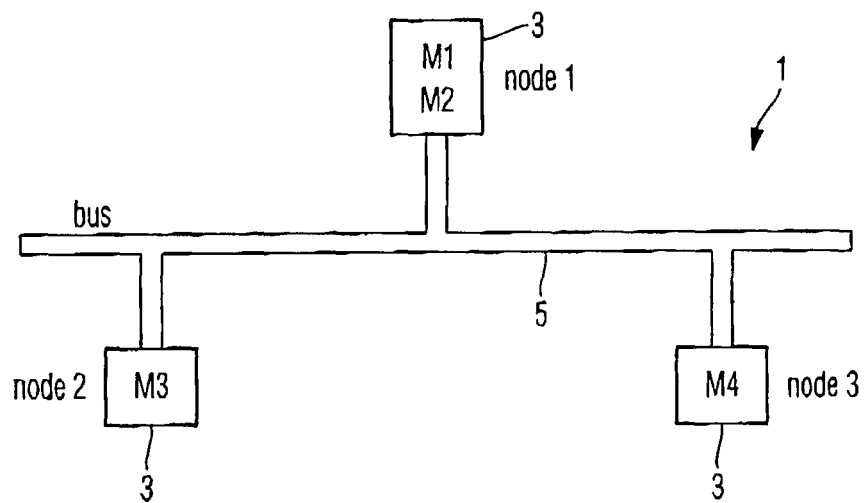
FIG. 1 shows a schematic diagram illustrating a system for performing distributed software.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

An exemplary system for executing distributed software is schematically illustrated in FIG. 1.

FIG. 1 shows a system 1 comprising three nodes 3 labeled as "node 1", "node 2" and "node 3", respectively, and which are connected to a communication channel 5 labeled as "bus". The bus is used for data communication between the nodes 3. The nodes are electronic devices which are in some fields of application, such as the automotive industry, referred to as electronic control units (ECU). Each node may include a dedicated piece of hardware which interfaces the node with the communication channel and which is then commonly referred to as a controller. In the example illustrated in FIG. 1, the communication channel is embodied as a bus having broadcasting semantics which means that data transmitted to the communication channel from one of the nodes may be received by any of the other nodes. The present invention is, however, not limited to such communication channel but encompasses also communication channels of other suitable topology and semantics.

The system 1 is configured to execute a software which is composted of plural modules M1, M2, M3 and M4. Modules are an example of a method of structuring complex software, and a module generally is a piece of software having an application programming interface (API). A software which is composed of plural modules allows transparent distribution of the software over plural nodes for executing the software. In the example shown in FIG. 1, node 1 executes modules M1 and M2, node 2 executes module M3 and node 3 executes module M4.

Figure 2:
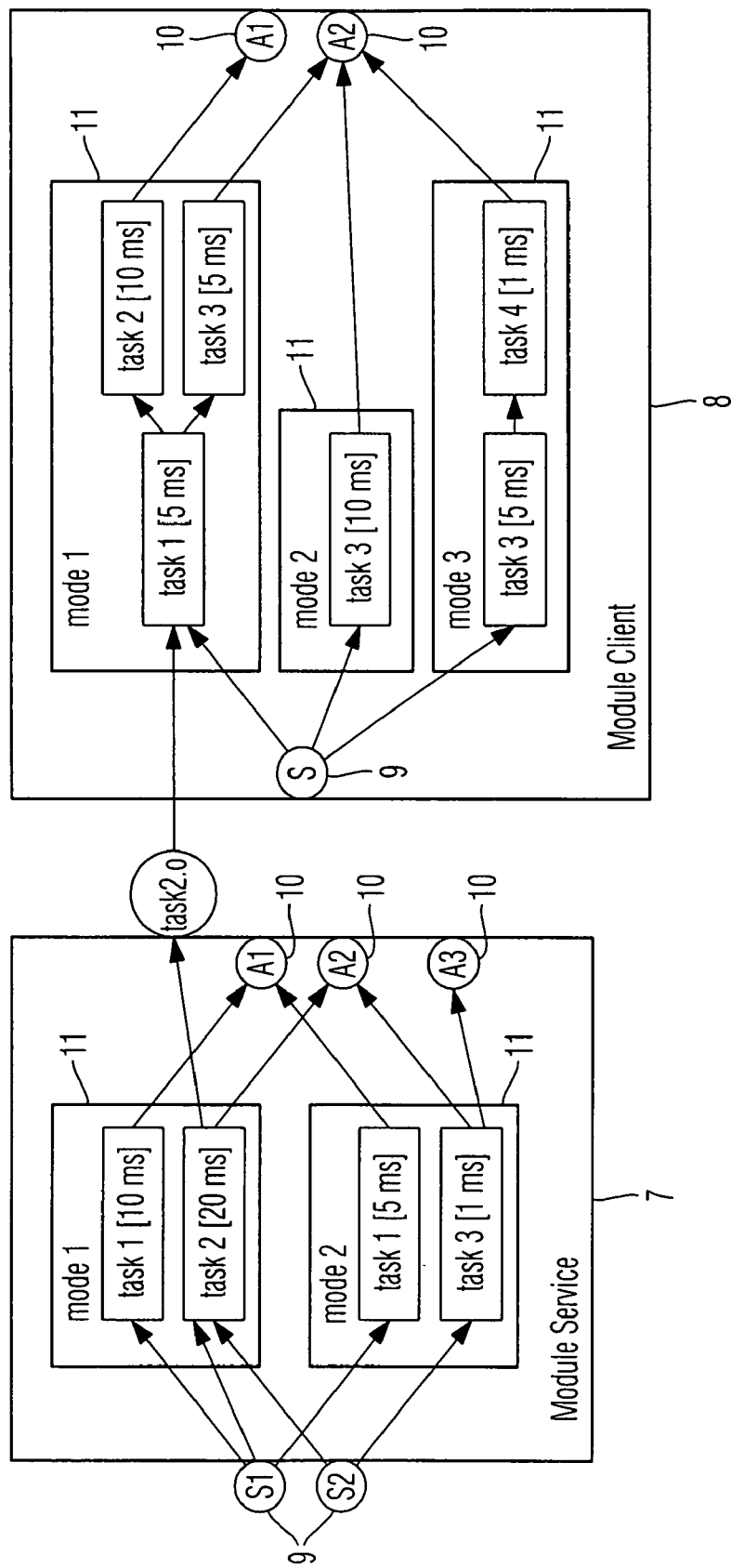
FIG. 2 is a schematic diagram representing exemplary modules of the software of the system shown in FIG. 1.

A more specific example of a software composed of two modules is illustrated in FIG. 2. The exemplary software shown in FIG. 2 comprises a first module 7 labeled as "module service" and a second module 8 labeled as "module client". Each module may consist of a set of sensors 9, a set of actuators 10 and a set of modes 11. The sensors 9 of module 7 are labeled "S1", "S2", and the sensor 9 of module 8 is labeled "S". The actuators 10 of module 7 are labeled as "A1", "A2" and "A3", and the actuators 10 of the module 8 are labeled as "A1" and "A2". Module 7 has two modes 11, labeled as "mode 1" and "mode 2". Module 8 has three modes 11, labeled as "mode 1", "mode 2" and "mode 3".

Each module 7, 8 may be in only one mode at a given time. Mode 1 of module 7 comprises two tasks labeled as "task 1" and "task 2", wherein task 1 is repetitively executed at a first period of ten milliseconds as indicated by "[10 ms]", and task 2 is repetitively executed at a period of twenty milliseconds (indicated by "[20 ms]").

Figure 3:
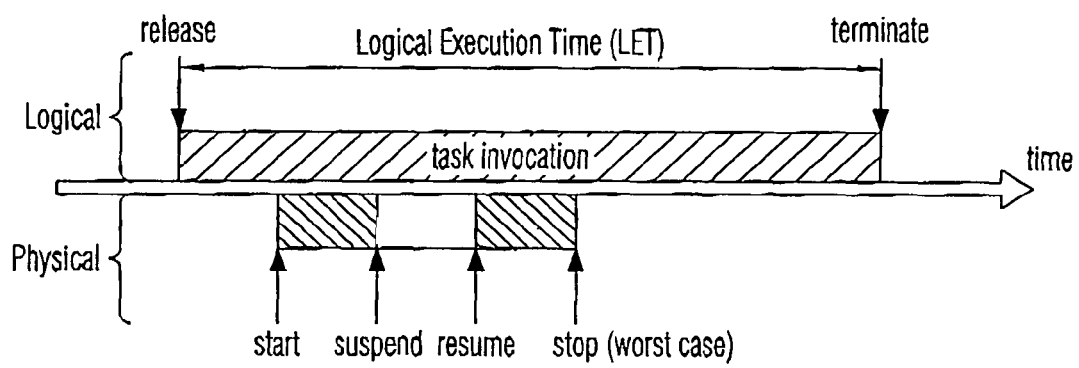
FIG. 3 is a schematic diagram for illustrating the concept of the Logical Execution Time (LET)

In the present example, task invocations might adhere to the LET semantics as introduced by the Giotto programming model (see the article of T. A. Henzinger et al. mentioned above). Task invocation according to LET is illustrated in the schematic diagram of FIG. 3. The inputs of the task are read at a beginning of a LET period. The beginning of the LET period is indicated by the arrow labeled "release" in FIG. 3. Newly calculated outputs of the task are available exactly at the end of the LET period which is indicated by an arrow labeled "terminate" in FIG. 3. The physical execution of the task on the node is started at a time indicated by an arrow labeled "start" and terminated at a time indicated by an arrow labeled "stop", wherein the physical execution of the task is suspended at a time indicated by an arrow labeled "suspend" and resumed at a time indicated by an arrow labeled "resume".

The time of physical execution is not precisely defined by LET. However, it is a requirement that the physical execution of the task has to finish before the end of the LET period. In other words, the start of the physical execution of the task can take place at or after the beginning of the LET period, and the end of the physical execution of the task has to occur before or at the end of the LET period. According to the LET semantics, the results of the calculation of the task are only available to the outside of the task at and after the end of the LET period rather than at the end of the physical execution of the task. This means that before the end of the LET period, the results of a previous invocation of the task are available.

Referring back to FIG. 2, task 1 of mode 1 of module 7 is repetitively executed at a period of ten milliseconds wherein the sensor is red exactly at the beginning of the ten-millisecond-period and wherein the results of the calculation of task 1 are made available to actuator A1 exactly at the end of the ten-millisecond-period.

FIG. 2 also illustrates communication between tasks. For example, task 1 in mode 1 of module 8 delivers its output as inputs to task 2 and task 3.

Further, FIG. 2 illustrates communication of tasks across module boundaries. An output of task 2 of mode 1 of module 7 is labeled as "task2.o" and is provided as an input to task 1 of mode 1 of module 8.

The composition of the software of a set of modules and the definition of the tasks of the modules according to LET semantics allows transparent distribution of the software across one or plural nodes, wherein a temporal behavior of the software is guaranteed. In particular, adding a new module will never affect the observable temporal behavior of other modules as long as internal scheduling mechanisms of the respective nodes guarantee a conformance to LET, given that worst case execution times (wcet) and execution rates are known for all tasks.

Figure 4:
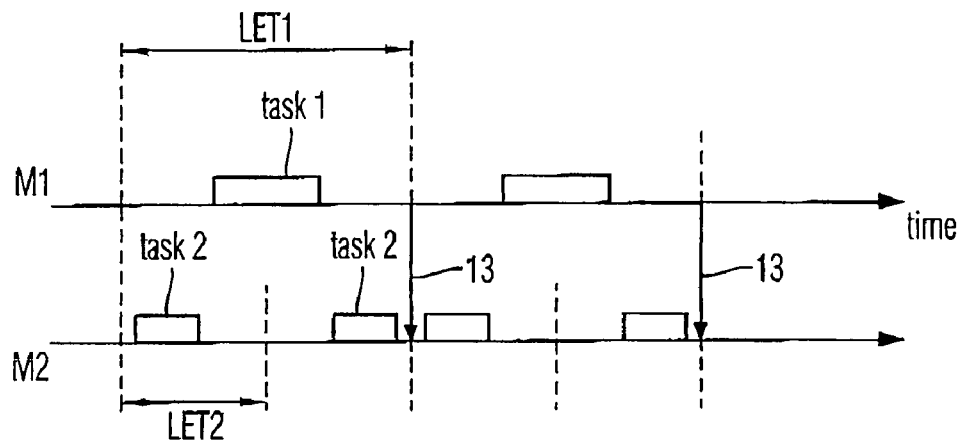
FIG. 4 is a schematic diagram illustrating concurrent execution of different tasks on a same node.

FIG. 4 is an illustration of execution of modules M1 and M2 by node 1 shown in FIG. 1. Module M1 has one task, "task 1", with LET1, and module M2 has one task, "task 2", with LET2. Task 2 uses the output of task 1 as input, and LET1 of task 1 is twice as large as LET2 of task 2. The grey rectangles in FIG. 4 schematically indicate the physical execution times of task 1 and task 2. The outputs of task 1 are made available to task 2 at the ends of the logical execution times LET1 of task 1 as indicated by arrows 13. This can be achieved by copying values from a location of memory associated with task 1 to a location of memory associated with task 2. Such copying will take close to zero time on a single node.

Both the third and fourth invocations of task 2 shown in FIG. 4 will use the output of the first invocation of task 1. This means that the fourth invocation of task 2 will not use the output of the second invocation of task 1 even though physical execution of the second invocation of task 1 is already completed when the physical execution of the fourth invocation of task 2 begins.

If communicating modules of a software are executed by different nodes, communication between tasks of the modules takes a significant time since the communication includes transmission of data across the communication channel, wherein only one node can transmit data at a given time.

Figure 5:
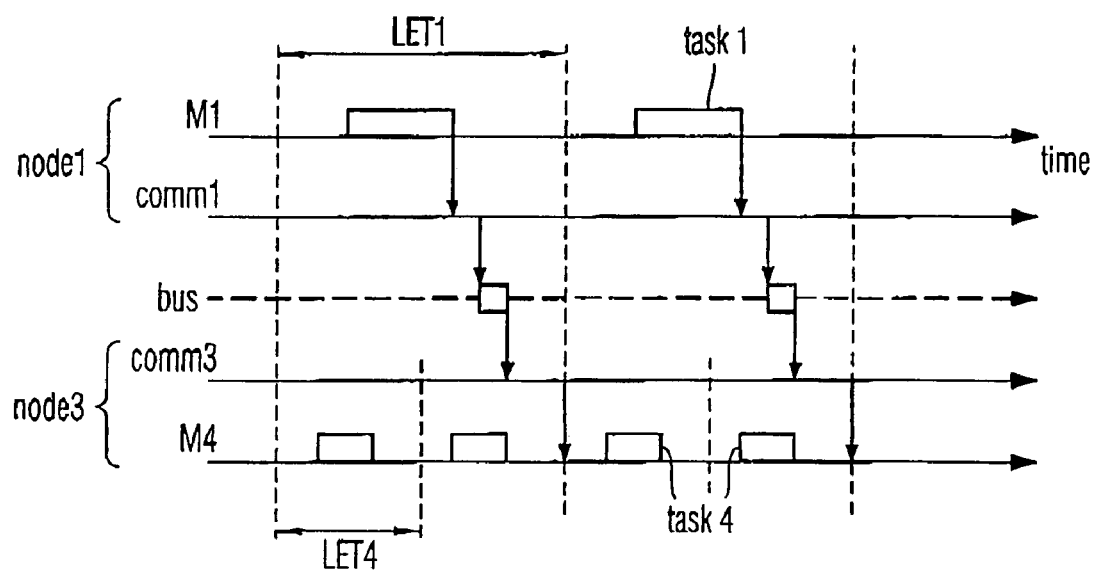
FIG. 5 is a schematic diagram illustrating concurrent execution of different tasks executed by different nodes and communicating across a communication channel.

FIG. 5 illustrates an example of communication between module M1 on node 1 and module M4 on node 3 of the system 1 shown in FIG. 1.

In the example shown in FIG. 5, task 4 of module M4 has a logical execution time period LET4 which is half of the logical execution time period LET1 of task 1. "comm1" and "comm3" in FIG. 5 indicate memory buffers of communication ports of node 1 and node 3, respectively. The earliest possible time a message can be sent from node 1 to node 2 is after the physical execution of task 1 has finished, which forms a message release constraint. According to the LET requirements, the message has to arrive at node 2 before the end of LET1, which forms a message deadline constraint.

An algorithm which generates a communication schedule of system 1 has to consider all message release constraints and all message deadline constraints of all messages that need to be communicated over the communication channel. These constraints typically change depending on the particular modes of each of the communicating modules. For example, a communication schedule describes statically, for example as a table, when which message has to be sent from which source node to which destination node. The message sending activities described in a communication schedule are repeated after a certain amount of time which can be referred to as a communication time interval. In applications using a bus as the communication channel, the communication time interval is commonly referred to as a bus period.

Figure 6A:
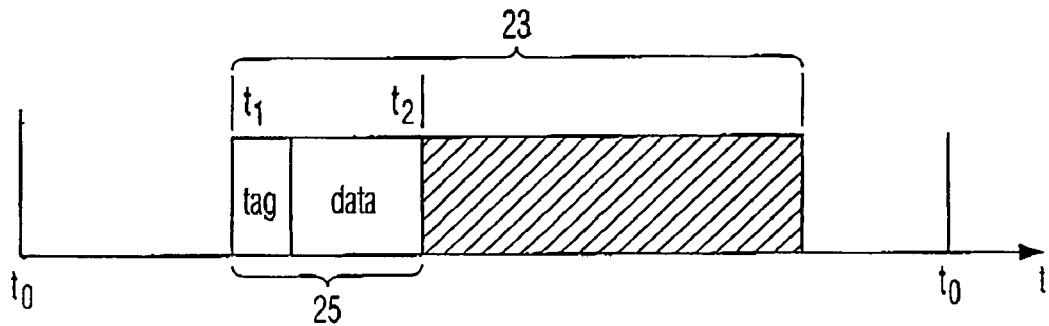
FIGS. 6a, 6b, 6c are illustrations of various communication time windows sharing a frame within communication time intervals.
Figure 6B:
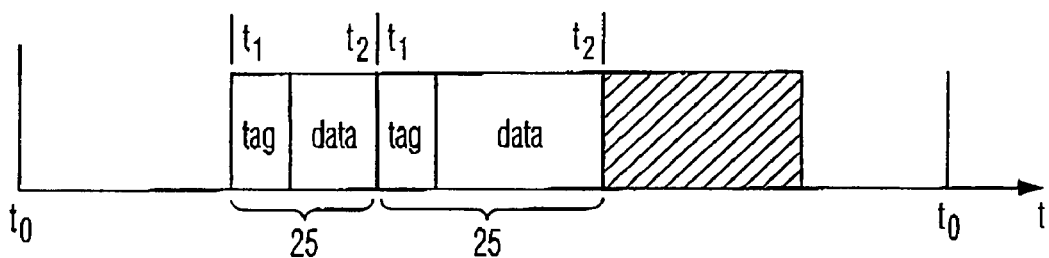
Figure 6C:
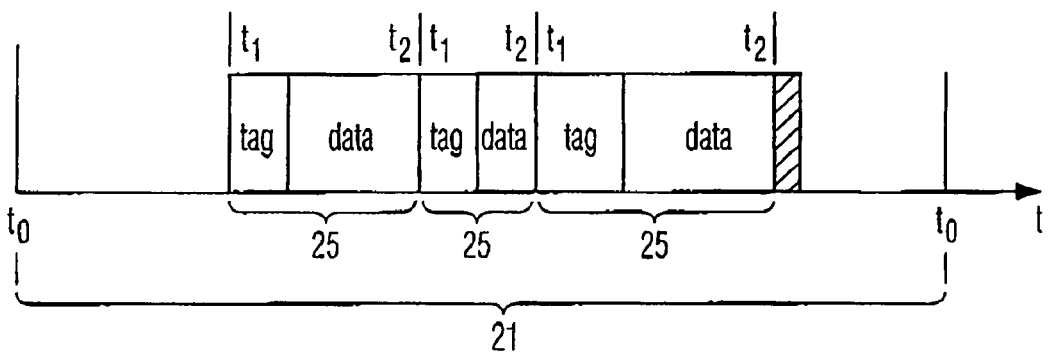

FIGS. 6a, 6b and 6c are illustrations of three exemplary communication time intervals which can occur at subsequent times in a system for executing distributed software according to an embodiment of the present invention. Each instance of a communication time interval 21 has a start time t0 and an end time which coincides with the start time t0 of the next instance of the communication time interval.

The communication schedule of the present example involves frames 23 within the communication time intervals 21 and having fixed durations and positions relative to the start times t0 of the communication time intervals. A number of messages may be bound to a frame 23, which may transmit data at different absolutes times but all within a communication time of frame 23 when measured relative to the communication time intervals 21. The absolute start and end time of a message transmission measured relative to the repetitive communication time intervals define the communication time window of that message.

Each transmission of data from a node includes transmission of a message comprising a representation of a tag and transmission of a representation of the data, each within a respective communication time window 25. Each representation of the data uses a predetermined number of bytes to encode the data generated by one or more tasks. Similarly, each representation of the tag includes a predetermined number of bytes encoding additional information, such as an identification of the node from which the message is sent, an identification of the task which generated the data, an identification of the module which includes the task which generated the data, an identification of a mode in which the module was when the task generated the data, and other information which might be useful to the particular application.

From FIGS. 6a, 6b and 6c it is apparent that start times and end times of the frames 23 are fixed within the communication time periods 21. Start times t1 and end times t2 of different communication time windows 25 associated with different messages bound to that frame relative to the respective communication time intervals 21 may differ from one communication time interval 21 to the other communication time interval. However, the start time t1 and the end time t2 of a communication time window 25 associated with one message are fixed from one communication time interval 21 to the other communication time interval 21.

Herein, the number of bytes of the representation of the tag and the number of bytes of the representation of the data may differ from one data transmission to the next data transmission.

An example of an algorithm for producing a communication schedule is illustrated below.

For the purposes of this example, it is assumed that the software is composed of modules adhering to the LET semantics. It is further assumed that the communication channel is based on broadcast semantics such that data sent by one node can be received at the same time by all other nodes. For the purposes of this example it is further assumed that a frame is the smallest unit of data which can be sent and that frames sent by different nodes cannot be combined into single frames. However, the invention is also applicable to systems where frames can be shared by multiple nodes, such as EtherCAT.

According to the present example, the access to the communication channel is collision free via a Time Division Multiple Access (TDMA) approach.

For the purposes of the present example it is further assumed that the software can be specified by a LET based description language, such as TDL, which restricts mode switches such that task invocations are never interrupted by a mode switch. Thus, mode switches are said to be harmonic which means that a mode switch must not occur during the LET of every task invocation of the currently active mode.

The desired schedule should be a static schedule such that the size of the schedule is finite. Thus, the schedule is performed repetitively at a period of a duration which is referred to as the communication time interval or, for the purposes of the present example which uses a bus, the communication time interval is referred to as a bus period.

The bus period is calculated as follows:

For each module M sending data to the communication channel, we define $mspGCD_M$ as the greatest common divisor (GCD) of mode periods and mode switch periods in all modes in module M. It is apparent that within a time period from $N \cdot mspGCD_M$ to $(N+1) \cdot mspGCD_M$ there will be no mode switch within module M. In other words, the time instance of mode switches can be expressed as integer multiples of $mspGCD_M$.

The bus period is then calculated as the greatest common divisor of the $nmspGCD_M$ of each module M which transmits data to the communication channel.

Each mode period then consists of an integer multiple of bus periods and the term "phase" is introduced in order to distinguish these mutually exclusive parts of a mode.

As illustrated above, data is transmitted to the communication channel within communication time windows in which a representation of a message comprising tag and data is sent. Each message has individual timing constraints, wherein the release constraint is the earliest time instance at which message sending can be started and wherein the deadline constraint of the message is the latest time instant when the message sending must be finished. It is possible to set the release constraint to the release time of the task invocation that produces that message plus its worst case execution time (wcet). The deadline constraint results from the end of the LET of the invocation of the data producing task. The release and deadline of a message are relative to the phase where the task invocation ends.

In order to use the communication channel efficiently, the messages of a phase can be mapped to one or more reserved communication frames within the bus period such that these communication frames can be used for all phases of a module.

For producing the communication schedule it is necessary to determine the frames and to bind each message to exactly one frame. At run-time, the node, the task invocations and the phase of a particular mode of a module determine which subset of the messages bound to a frame is actually sent. As the content of a frame varies at run-time, the tags are useful to identify the messages.

Figure 7:
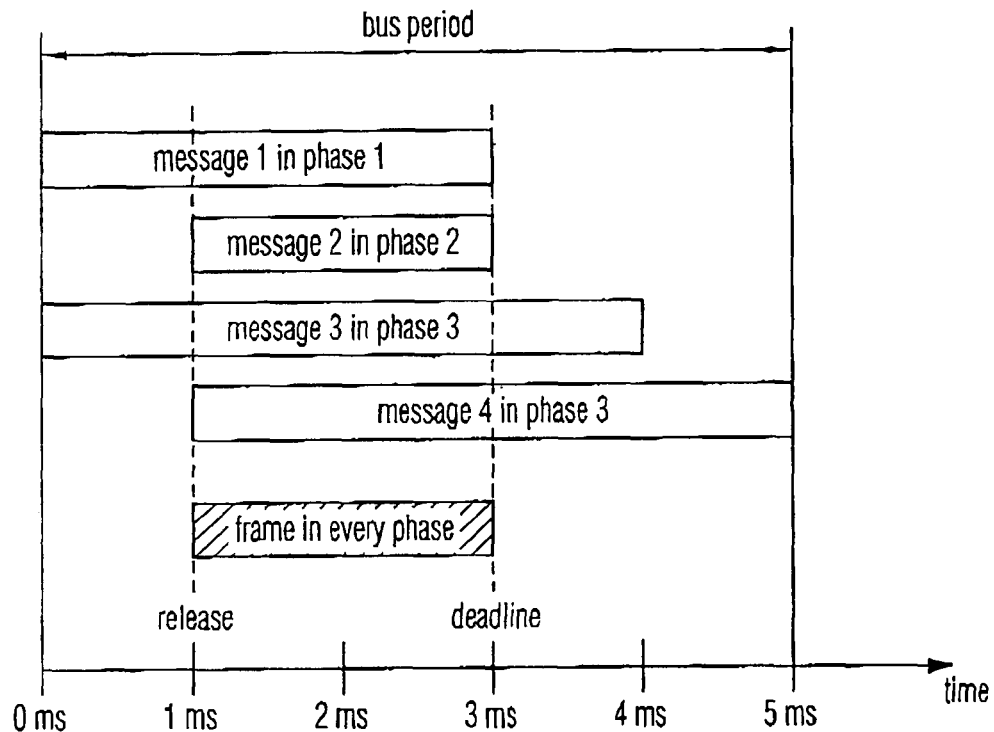
FIG. 7 is an illustration of a method of determining a communication schedule used for data transmission in the system shown in FIG. 1.

The release constraint of a frame is the maximum of the release constraints of the messages bound to the frame. Similarly, the deadline constraint of a frame is the minimum of the deadline constraints of all messages bound to the frame. This is schematically illustrated in to FIG. 7 for an exemplary module which is assumed to have three phases and to produce a message 1 of four bytes in phase 1, a message 2 of three bytes in phase 2, and two messages 3 and 4 of one byte each in phase 3. Depending on their size and timing constraints, all messages may be bound to the same frame with a size of four bytes. The left and right bounds of the boxes representing the messages and the frame represent the release and deadline constraints, respectively.

Figure 8:
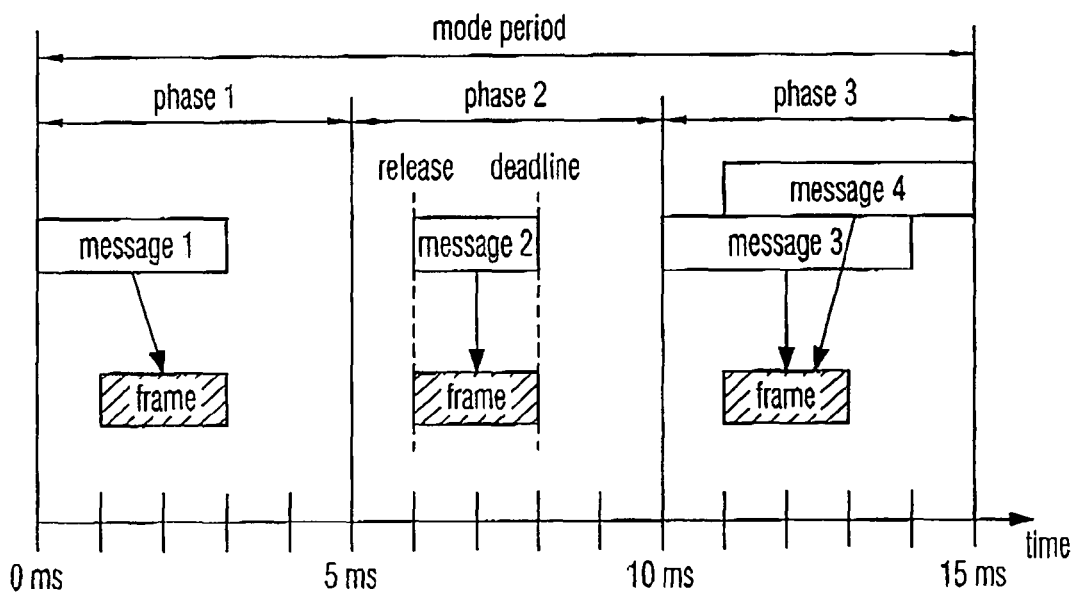
FIG. 8 is a further illustration of a method of determining a communication schedule used for data transmission in the system shown in FIG. 1.

FIG. 8 illustrates the release and deadline constraints of the individual messages and the frame they are bound to throughout the whole mode period consisting of three distinct phases.

An algorithm of binding messages to frames may be represented by the following pseudo-code:

```
createFrames(Module M) returns Set {
    let frames be an empty      set
    for each mode m of module M {
        for each phase p of m {
            let msgs be an empty set
            for each task invocation instance t that ends in p {
                add new Message(M, m, t, p) to msgs
            }
            bindMsgs(msgs, frames)
        }
    }
    return frames
}
bindMsgs(Set msgs, Set frames) {
    reset the available bytes of all frames to the size of
    each frame
    for each msg in msgs {
        if (frames is empty) {
            createFrame(msg, frames)
        } else {
            for each frame in frames {
                computeMetric(msg, frame)
            }
            select the frame selFrame with the highest metric
            if (selFrame.metric > threshold) {
```

-continued

```
        bind(msg, selFrame)
    } else {
        createFrame(msg, frames)
    }
   }
  }
 }
```

The method bindMsgs associates a message with an existing frame, if possible. Otherwise a new frame is created and the message is bound to the new frame. The method createFrame creates a frame, binds the message to that frame, sets the size of the frame to the size of the message, and adds the frame to the set of frames. The method createFrame also checks if the size of the frame does not exceed the maximum allowed by the communication channels such that the frame can be transmitted within the communication time interval, i.e. the bus period.

The decision of binding a message to a frame depends on the result of a metric computation that depends on a number of bytes which are available from the size of the frame. Therefore, instance variable available is defined for each frame and reset at the beginning of each phase to the size of the frame. The method bindMsgs binds a message to a frame and reduces the available bytes of the frame by the message size. An example of the method computeMetric using heuristics will be illustrated herein below.

In this example, the method computeMetric calculates a real number between 0 and 1 and stores that number in the instance variable metric of the frame. For a respective message, the value of computeMetric is calculated for each frame, the frame resulting in the highest value of the metric is identified, and the message is bound to that frame if the value of the metric exceeds a predetermined threshold value. Thus, the allocation of a message to an existing frame introduces a tradeoff between saving bandwidth and tightening the timing constraints. For this purpose, the algorithms and heuristics presented herein may be advantageously used. However, these algorithms and heuristics represent only exemplary embodiments of the invention, and other algorithms and heuristics are conceivable which might even result in further optimizations.

An exemplary metric illustrated herein below has two parts which are referred to as overlapping metric and enlargement metric and which measure the compatibility of the timing and size constraints between a frame and a message. The overlapping metric measures a degree of overlap between a message and a frame, for example, according to the following formula:

$$metric_{overlapping} = \frac{\frac{overlapping}{frame.d - frame.r} + \frac{overlapping}{msg.d - msg.r}}{2},$$

wherein overlapping=Min(frame.$d$,msg.$d$)−Max(frame.$r$, msg.$r$), wherein
frame.r represents the release constraint of the frame,
frame.d represents the deadline constraint of the frame,
msg.r represents the release constraint of the message, and
msg.d represents the deadline constraint of the message.

The enlargement metric measures by how much a size of a frame needs to be enlarged so that a message fits in. The enlargement metric may be calculated by the following formula:

$$metric_{enlargement} = \frac{frame.size}{frame.size + enlargement},$$

wherein enlargement=Max(0,$msg$.size−frame.available), wherein
frame.size represents the size of the frame,
frame.available represents the amount of frame size which is still available, and
msgsize represents the size of the message.

The value of computeMetric can then be calculated by averaging the overlapping metric and the enlargement metric according to the following formula:

$$metric = \frac{metric_{overlapping} + metric_{enlargement}}{2},$$

wherein this formula is only applied when both the enlargement metric and the overlapping metric yield a positive value. If one of the overlapping metric and the enlargement metric yields a value equal to or less than zero, then the value of computeMetric is calculated to be also zero.

An example of producing a communication schedule in accordance with the above algorithm is provided in the following with respect to module M3 executed by node 2 in system 1 shown in FIG. 1.

In this example module M3 has two modes M1 and M2 and three tasks t1, t2 and t3 as illustrated in Table 1 below.

TABLE 1

| Mode | Mode period | Tasks with their LETs in brackets |
|------|-------------|-----------------------------------|
| m1   | 5 ms        | t1 (5 ms)                         |
| m2   | 10 ms       | t2 (10 ms), t3 (10 ms)            |

Details of the tasks t1, t2 and t3, such as their worst case execution time (wcet) and a size of a representation of their output data are given in Table 2 below.

TABLE 2

| Name | WCET | Output Size |
|------|------|-------------|
| t1   | 1 ms | 4 byte      |
| t2   | 1 ms | 2 byte      |
| t3   | 1 ms | 2 byte      |

Since a mode switch should not occur during a LET of a task invocation of a currently active mode, mspGCD$_M$ of module M3 is calculated as follows:

mspGCD$_{M3}$=GCD(5,10)=5 ms.

The bus period is calculated as the greatest common divisor of mspGCD$_M$ of each module M. In the present example, where only module M3 is sending data to the communication channel, only module M3 has to be included in the GCD calculation. Thus, the bus period equals to mspGCD$_{M3}$ which is 5 ms.

Table 3 indicated below lists all messages that have to be sent by the tasks in all modes. The release times and deadline times are relative to the mode period of the task that sends the message. The release time is equal to the beginning of the LET plus their worst case execution time (wcet), and the deadline time is equal to the end of the LET.

TABLE 3

| Message | Mode | Task | Invocation | Size | Release | Deadline |
|---------|------|------|------------|------|---------|----------|
| 1 | m1 | t1 | 1 | 4 | 1 ms | 5 ms |
| 2 | m2 | t2 | 1 | 2 | 1 ms | 10 ms |
| 3 | m2 | t3 | 1 | 2 | 1 ms | 10 ms |

Table 4 indicated below lists the messages of Table 3 wherein the release and deadline constraints are indicated relative to the bus period for all phases of the two modes.

TABLE 4

| Message | Mode | Task | Invocation | Size | Phase | Release | Deadline |
|---------|------|------|------------|------|-------|---------|----------|
| 1 | m1 | t1 | 1 | 4 | 1 | 1 ms | 5 ms |
| 2 | m2 | t2 | 1 | 2 | 2 | 0 ms | 5 ms |
| 3 | m2 | t3 | 1 | 2 | 2 | 0 ms | 5 ms |

According to the algorithm indicated by the pseudo-code above, an iteration is performed over all modes and phases, and an evaluation is made as to whether messages are assigned to existing frames or whether new frames are created. The procedure according to the algorithm is started with mode M1 and phase 1, which is the only phase in this mode. At the beginning of the procedure, no frame has been created, and the frame created for the mode inherits its timing constraints from the first message. The frame size then equals to the message size plus the tag size which is chosen to be one byte in the present example.

Table 5 below lists the frames and bound messages according to the present stage of the procedure.

TABLE 5

| Frame | Size | Release | Deadline | Bound Messages |
|-------|------|---------|----------|----------------|
| 1 | 5 | 1 ms | 5 ms | 1 |

In a next step, mode M2 is considered for phase 1, wherein no data transmission is to be performed in phase 1 for mode M2. Therefore, message 2 in phase 2 is considered next. The metric is evaluated in order to determine whether to bind message 2 to the existing frame or not. In this example, a threshold value of 0.5 is used. The overlapping metric is calculated as follows:

$$overlapping = \text{Min}(5, 5) - \text{Max}(1, 0) = 4$$

$$metric_{overlapping} = \frac{\frac{4}{5-1} + \frac{4}{5-0}}{2} = \frac{1 + \frac{4}{5}}{2} = 0.9$$

Since the available space of every frame is reset in every new phase, it is apparent that the frame has not to be enlarged in this phase, wherein the size of message 2 is three bytes (including a tag of one byte). The value of the enlargement metric is one, accordingly. The value of the overall metric is calculated to be 0.95 by averaging 0.9 and 1.0. Since 0.95 is well above the threshold, message 2 gets bound to frame 1, reducing the available space in this phase to two bytes. Table 6 indicated below represents the frames and bound messages in this present stage of the procedure.

TABLE 6

| Frame | Size | Release | Deadline | Bound Messages |
|-------|------|---------|----------|----------------|
| 1 | 5 | 1 ms | 5 ms | 1, 2 |

Message 3 in phase 2 is considered next. As the timing requirements for message 3 are the same as for message 2, the result of the overlapping metric is 0.90 again.

The size of message 3 is three bytes, wherein a tag of one byte is included. Thus, msg.size=3, frame.available=2 and frame.size=5. With these values, the enlargement metric can be calculated as follows:

$$enlargement = \text{Max}(0, (3 - 2)) = 1$$

$$metric_{enlargement} = \frac{5}{5 + 1} = 0.83$$

The overall metric results in 0.87 by averaging 0.90 and 0.83, which is well above the chosen threshold of 0.5. Thus, also message 3 is bound to frame 1, increasing its size to six bytes and illustrated in Table 7 below.

TABLE 7

| Frame | Size | Release | Deadline | Bound Messages |
|-------|------|---------|----------|----------------|
| 1 | 6 | 1 ms | 5 ms | 1, 2, 3 |

Figure 9:
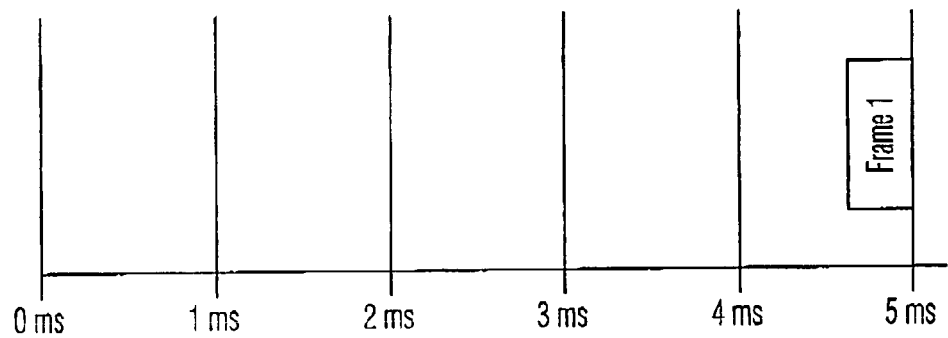
FIG. 9 is a still further illustration of a method of determining a communication schedule used for data transmission in the system shown in FIG. 1.

In this presented example, it is possible to bind all messages to one single frame. For this identified frame, a suitable bus schedule has to be generated while taking the release and deadline constraints into account. Such schedule can be determined according to the latest release time scheduling algorithm LRT as illustrated in J. W. S. Liu, "Real-Time Systems", Prentice-Hall, 2000. This results in a bus schedule as illustrated in FIG. 9, where frame 1 is scheduled such that its transmission ends at 5 ms.

Figure 10:
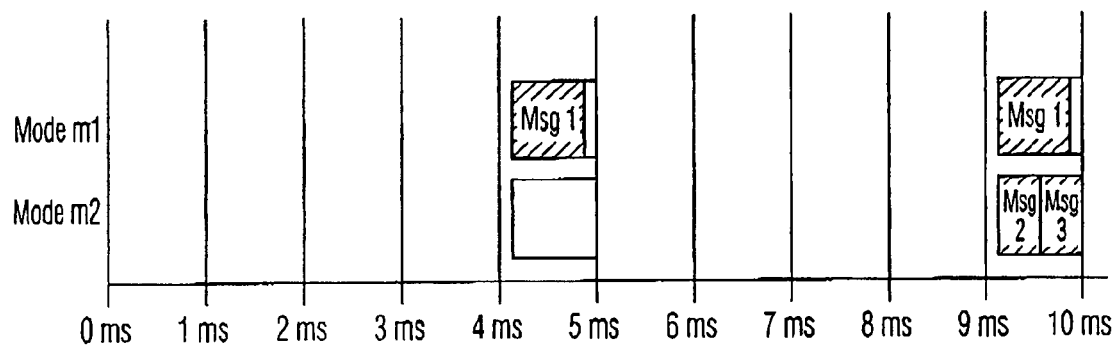
FIG. 10 is a still further illustration of a method of determining a communication schedule used for data transmission in the system shown in FIG. 1.

FIG. 10 is an illustration of the dynamic multiplexing resulting from the binding of messages according to the algorithm illustrated above for modes m1 and m2 of module M3. Frame 1 which has a capacity of six bytes is filled with message 1 with its size of five bytes in mode m1, or with message 2 with its size of three bytes and with message 3 with its size of also three bytes in mode m2, or the frame is left empty.

Embodiments of a system for executing distributed software under hard real-time conditions comprise a plurality of nodes and a communication channel. Nodes are allowed to transmit data across the communication channel within time windows relative to repetitive communication time intervals of the communication channel, wherein a number of bytes transmitted within the communication time windows may vary from communication time window to communication time window. The data may be transmitted as a message comprising a representation of an identifying tag and a representation of the data. Also a number of bytes representing respective tags may vary from communication time interval to communication time interval.

The above illustrated systems and methods for executing distributed software can be included in any technical application for controlling a function or performance thereof. For example, the systems and methods can be included in a vehicle, such as an automobile, an airplane, a ship, a missile and others.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A system for executing a distributed software, the system comprising:
   a plurality of nodes; and
   a communication channel;
   wherein the nodes are configured to allow communication across the communication channel, wherein repetitive communication time intervals of a predetermined constant duration are definable and wherein data transmission occurs within data communication time windows defined by start times and end times relative to the communication time intervals;
   wherein the distributed software comprises at least a first task and a second task;
   wherein the nodes are configured to execute the first and second tasks such that only one of the first and second tasks is executed at a given time;
   wherein the first task generates first data and transmits the first data to the communication channel repetitively at a first period, wherein data transmission of the first data occurs within first communication time windows having the same start and end times relative to their respective communication time intervals;
   wherein the second task generates second data and transmits the second data to the communication channel repetitively at a second period, wherein data transmission of the second data occurs within second communication time windows having same start and end times relative to their respective communication time intervals;
   wherein each of the first and second periods is an integer multiple of the predetermined constant duration;
   wherein the start time of the first communication time windows is prior to the end time of the second communication time windows, and the start time of the second communication time windows is prior to the end time of the first communication time windows;
   wherein the first task and/or the second task is configured to have a predefined logical execution time interval associated therewith, wherein a physical execution of an invocation of the task starts at or after a beginning of the logical execution time interval and wherein the physical execution of the invocation of the task is completed before or at an end of the logical execution time interval, and
   wherein the node executing the first task is further configured to execute a third task, wherein a logical execution time interval associated with the first task overlaps with a logical execution time interval associated with the third task.

2. A system for executing a distributed software, the system comprising:
   a plurality of nodes; and
   a communication channel;
   wherein the nodes are configured to allow communication across the communication channel, wherein repetitive communication time intervals of a predetermined constant duration are definable and wherein data transmission occurs within data communication time windows defined by start times and end times relative to the communication time intervals;
   wherein the distributed software comprises at least a first task and a second task;
   wherein the nodes are configured to execute the first and second tasks such that only one of the first and second tasks is executed at a given time;
   wherein the first task generates first data and transmits the first data to the communication channel repetitively at a first period, wherein data transmission of the first data occurs within first communication time windows having the same start and end times relative to their respective communication time intervals;
   wherein the second task generates second data and transmits the second data to the communication channel repetitively at a second period, wherein data transmission of the second data occurs within second communication time windows having same start and end times relative to their respective communication time intervals;
   wherein each of the first and second periods is an integer multiple of the predetermined constant duration;
   wherein the start time of the first communication time windows is prior to the end time of the second communication time windows, and the start time of the second communication time windows is prior to the end time of the first communication time windows;
   wherein the data transmission of the data includes transmission of a message including a representation of the data and a tag, wherein the tag is indicative of the task which generated the data, and
   wherein the tag is indicative of a module which includes the task which generated the data.

3. The system according to claim 2, wherein the tag is indicative of a mode of the module which includes the task which generated the data.

4. A system for executing a distributed software, the system comprising:
   a plurality of nodes; and
   a communication channel;
   wherein the nodes are configured to allow communication across the communication channel, wherein repetitive communication time intervals of a predetermined constant duration are definable and wherein data transmission occurs within data communication time windows defined by start times and end times relative to the communication time intervals;
   wherein the distributed software comprises at least a first task and a second task;
   wherein the nodes are configured to execute the first and second tasks such that only one of the first and second tasks is executed at a given time;
   wherein the first task generates first data and transmits the first data to the communication channel repetitively at a first period, wherein data transmission of the first data occurs within first communication time windows having the same start and end times relative to their respective communication time intervals;

wherein the second task generates second data and transmits the second data to the communication channel repetitively at a second period, wherein data transmission of the second data occurs within second communication time windows having same start and end times relative to their respective communication time intervals;

wherein each of the first and second periods is an integer multiple of the predetermined constant duration;

wherein the start time of the first communication time windows is prior to the end time of the second communication time windows, and the start time of the second communication time windows is prior to the end time of the first communication time windows, and wherein the start time of the first communication time windows is equal to the start time of the second communication time windows.

5. A system for executing a distributed software, the system comprising:

a plurality of nodes; and a communication channel;

wherein the nodes are configured to allow communication across the communication channel, wherein repetitive communication time intervals of a predetermined constant duration are definable and wherein data transmission occurs within data communication time windows defined by start times and end times relative to the communication time intervals;

wherein the distributed software comprises at least a first task and a second task;

wherein the nodes are configured to execute the first and second tasks such that only one of the first and second tasks is executed at a given time;

wherein the first task generates first data and transmits the first data to the communication channel repetitively at a first period, wherein data transmission of the first data occurs within first communication time windows having the same start and end times relative to their respective communication time intervals;

wherein the second task generates second data and transmits the second data to the communication channel repetitively at a second period, wherein data transmission of the second data occurs within second communication time windows having same start and end times relative to their respective communication time intervals;

wherein each of the first and second periods is an integer multiple of the predetermined constant duration;

wherein the start time of the first communication time windows is prior to the end time of the second communication time windows, and the start time of the second communication time windows is prior to the end time of the first communication time windows, and wherein the end time of the first communication time windows is equal to the end time of the second communication time windows.

* * * * *